United States Patent [19]

Michelet

[11] 3,910,967

[45] Oct. 7, 1975

[54] PROCESS FOR THE PREPARATION OF TRIMETHYLBENZOQUINONE

[75] Inventor: Daniel Michelet, Tassin-la-demi-Lune, France

[73] Assignee: Rhone-Poulenc S.A., Paris, France

[22] Filed: Apr. 11, 1974

[21] Appl. No.: 460,203

[30] Foreign Application Priority Data
Apr. 16, 1973 France .............................. 73.13711

[52] U.S. Cl. .......................... 260/396 R; 260/621 R
[51] Int. Cl.$^2$ .......................................... C07C 49/64
[58] Field of Search ................................ 260/396 R

[56] References Cited
UNITED STATES PATENTS
2,295,446  9/1942  Behnisch ..................... 260/396 R

*Primary Examiner*—Vivian Garner
*Attorney, Agent, or Firm*—Cushman, Darby & Cushman

[57] ABSTRACT

Trimethylbenzoquinone is made by oxidizing isophorone with a thallic compound in the presence of water and preferably an acid.

9 Claims, No Drawings

PROCESS FOR THE PREPARATION OF TRIMETHYLBENZOQUINONE

The present invention provides a process for the preparation of trimethylbenzoquinone from isophorone (3,5,5-trimethyl-cyclohex-2-enone).

Trimethylbenzoquinone, an important intermediate in the synthesis of vitamin E, can be produced from trimethylphenols (2,3,5-trimethyl- and 2,3,6-trimethylphenols) by various processes. These phenols may be oxidised directly to the corresponding quinone with an alkali metal nitrosodisulphonate, especially FREMY salt [compare U.S. Pat. No. 2,782,210; H. J. TEUBER et al., Ber., 86, 1036 (1953); and P. A. WEHRLI et al., J. Org. Chem., 37, 2341 (1972)]. Alternatively they may be oxidised with air in the presence of complex salts of cobalt and Schiff's bases of salicylaldehyde (French Patent Application published under No. 2,015,576) or with alkali metal dichromates or manganese dioxide [compare L. I. SMITH et al., J. Org. Chem., 4, 320 (1939)]. It is also possible to convert the above-mentioned trimethylphenols into trimethylbenzoquinone in an indirect manner, for example by nitrosating the phenols and then converting p-nitrosotrimethylphenol to the quinone by the usual methods [compare P. KARRER et al., Helv. Chim. Acta, 22, 657 (1939)], or by sulphonating the phenols and then converting the sulphonic acid produced to the quinone with potassium dichromate or manganese dioxide (compare published French Application No. 2,051,407). The trimethylphenols used as the starting material are themselves prepared from trimethylcyclohexenones; thus P. A. WEHRLI et al., loc. cit., produced 2,3,5-trimethyl- and 2,3,6-trimethyl-phenols by aromatisation of 3,5,6-trimethyl-cyclohex-2-enone and 2,5,6-trimethyl-cyclohex-2-enone by heating under reflux in the presence of palladium on charcoal. Isophorone can be rendered aromatic to form 2,3,5-trimethylphenol by heating in the vapour phase at a high temperature in the presence of a methylation agent such as methanol and a catalyst based on alumina, chromium oxide and an alkali metal oxide (compare British Pat. No. 1,181,437). The reaction involves demethylation of isophorone, followed by aromatisation of the intermediate compound to form dimethylphenol and methylation. In short, to pass from a trimethylcyclohex-2-enone to trimethylbenzoquinone necessitates carrying out numerous steps, and this limits the industrial value of the processes described above. T. ICHIKAWA et al., Bull. Chem. Soc. Japan, 41, 1228 (1968) have indeed proposed a method for passing directly from 3,5,6-trimethyl- and 2,5,6-trimethyl-cyclohex-2-enone to trimethylbenzoquinone by oxidation with t.butyl chromate, but this process is dependent on the use of a rather uncommon oxidising agent and on long reaction times (of the order of 12 to 24 hours) to obtain yields of the order of 50%. Furthermore, the trimethylcyclohex-2-enones used are relatively expensive products compared with isophorone, which is a product readily produced by condensation of acetone in an alkaline medium. However, no process which makes it possible to pass directly from isophorone to trimethylbenzoquinone has been proposed hitherto. The present invention provides a method suitable for carrying out such a conversion.

More specifically, the present invention provides a process for the preparation of trimethylbenzoquinone, which comprises oxidising isophorone with a thallium III compound in the presence of water.

This process makes it possible to pass directly from isophorone to trimethylbenzoquinone and involves simultaneously effecting the migration of a methyl group, aromatisation and oxidation. The overall reaction can be represented by the following equation:

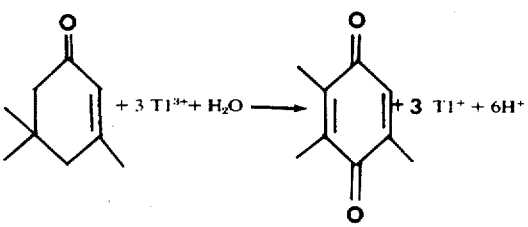

The amount of water present during the reaction can vary within wide limits. In fact, it is possible to employ an amount of water close to the stoichiometric requirement, that is to say one mol per mol of isophorone, or to employ an amount greater than this, the water being then used as the reaction medium, and especially as a solvent for the thallium III compound.

As the thallium III compound it is possible to employ salts of inorganic acids such as thallic sulphate, thallic nitrate, thallic perchlorate, thallic phosphate or thallic trifluoroborate; salts of sulphonic acids such as alkane-sulphonic acids (methanesulphonic acid and ethane-1,2-disulphonic acid), cycloalkane-sulphonic acids, and aryl-sulphonic acids (benzenesulphonic acid, toluene-sulphonic acids and naphthalenesulphonic acids); and salts of aliphatic, cycloaliphatic or aromatic mono- or polycarboxylic acids, such as formic acid, acetic acid, propionic acid, butyric acid, pentanoic acid, decanoic acid, oxalic acid, succinic acid, adipic acid, lactic acid, citric acid, cyclohexanecarboxylic acid, benzoic acid, toluic acid, orthophthalic acid, isophthalic acid and salicylic acid. Amongst these salts, thallic acetate, thallic formate, thallic oxalate and thallic citrate may be especially mentioned.

Other thallium III compounds which may be used in the process of the invention include the complex salts of thallium III produced from the abovementioned salts and mono- or poly-dentate ligands e.g. nitrogen-containing bidentate ligands such as 2,2'-dipyridyl and phenanthroline. These complex salts can be used in the preformed state or can be prepared in situ by carrying out the oxidation in the presence of a thallium salt and a suitable ligand.

In general terms, the salts of oxygen-containing inorganic acids and thallic carboxylates are the preferred oxidising agents.

The amount of thallium III compound, expressed as the number of $Tl^{3+}$ ions per molecule of isophorone, can be close to the stoichiometric requirement or can differ substantially therefrom. More specifically, it can be between 1.5 and 6 $Tl^{3+}$ ions per molecule of isophorone, although it is possible to work beyond these limits.

It has also been found that it is advantageous, no matter what thallium compound is used and under any reaction conditions, to work in the presence of a carboxylic acid, as this leads to higher yields of trimethylbenzoquinone. This carboxylic acid can be saturated or ethylenically unsaturated, linear or branched, aliphatic adding distilled water and the trimethylhydroquinone is measured by polarography by comparison with a sample of pure trimethylhydroquinone. The result obtained in this way makes it possible to calculate that there is $5 \times 10^{-2}$ mol of trimethylbenzoquinone in the whole reaction mixture (7.6 g.), which corresponds to a yield of 42.7% of trimethylbenzoquinone based on the isophorone introduced.

The reaction mixture is extracted 4 times with 100 cm³ of diethyl ether each time. The ether extract is dried over $Na_2SO_4$ and the ether is then driven off by distillation. 200 cm³ of water are then added to the residue, followed by zinc powder until decolorisation is complete. The mixture is then neutralised to pH 8.5 by adding sodium carbonate, the excess zinc powder is filtered off, and the filtrate is extracted with diethyl ether. The extract is dried over $Na_2SO_4$ and is then concentrated to 20 cm³. 50 cm³ of chloroform are then added and the mixture is concentrated to 30 cm³. On cooling to 0°C., a precipitate is obtained which is filtered off and dried to constant weight. In this way, 4.4 g. of a product containing 98% of trimethylhydroquinone are collected (measurement by mass spectrometry, polarography and NMR ; the spectra correspond to those of trimethylhydroquinone).

The filtrate is concentrated to 10 cm³, which makes it possible to obtain an additional fraction of 0.7 g. of precipitate containing 70% of trimethylhydroquinone.

EXAMPLE 2

The procedure of Example 1 is followed, but at 95°C., and using the following ingredients: isophorone (129 mg); anhydrous acetic acid (6 cm³); the solution of thallic sulphate in sulphuric acid of Example 1 (11 cm³). The pH of the mixture is 0.4.

After reducing the trimethylbenzoquinone with zinc powder, using an aliquot portion of reaction mixture, the trimethylhydroquinone is measured as in Example 1. It can be calculated from the measurement that the amount of trimethylbenzoquinone present in the reaction mixture would lead, after reduction, to the formation of 72 mg. of trimethylhydroquinone, which corresponds to a yield of 50.6% based on the isophorone introduced.

EXAMPLES 3 to 6

The procedure of Example 1 is followed, varying the amount of anhydrous acetic acid employed. The results obtained are listed in the following Table I.

TABLE I

| Ex. | $CH_3COOH$ % by weight | $\frac{Tl^{3+}}{isophorone}$ | Temp. °C. | Duration | Yield in % based on the isophorone introduced |
|---|---|---|---|---|---|
| 3 | 0 | 3 | 63 | 1 hr.30 mins. | 9.1 |
| 4 | 0.54 | " | 70 | " | 9.6 |
| 5 | 8 | " | " | 1 hr.15 mins. | 26.4 |
| 6 | 57.5 | " | 90 | 55 mins. | 37.5 |

EXAMPLES 7 to 16

The procedure of Example 1 is followed, varying the nature of the carboxylic acid used. The conditions and the results obtained are listed in Table II below.

TABLE II

| Ex. | Carboxylic acid Nature | Amount % by weight | $\frac{Tl^{3+}}{isophorone}$ | Temperature in °C | Duration | pH | Yield % based on the isophorone introduced |
|---|---|---|---|---|---|---|---|
| 7 | HCOOH | 9.5 | 3 | 70 | 1 hr. 30 minutes | 0.45 | 23.4 |
| 8 | $CH_3CH_2COOH$ | 8 | " | " | 1 hr. | " | 31.4 |
| 9 | Succinic acid | " | " | " | " | " | 32 |
| 10 | $CF_3$—COOH | " | " | " | 35 minutes | " | 23.8 |
| 11 | Lactic acid | " | " | 85 | 30 minutes | " | 16 |
| 12 | Acrylic acid | " | " | 60 | 1 hr. 10 minutes | " | 22 |
| 13 | $CH_3$—CH$_2$—COOH | 29.2 | " | " | " | " | 43.2 |
| 14 | Maleic acid | 7.5 | " | " | 20 minutes | " | 12.6 |
| 15 | o-Phthalic acid | " | " | " | " | " | 15.8 |
| 16 | Citric acid (1) | 6.4 | " | " | " | " | 15 |

(1) The reaction mixture introduced comprised 100 cm³ of the thallic solution of Example 1, 1.4 g of isophorone, 14 g of citric acid and 90 cm³ of water.

EXAMPLES 17 to 20

The procedure of Example 1 is followed, in the presence of various solvents. The conditions used and the results obtained are listed in the following Table III:

TABLE III

| Ex. | Carboxylic acid Nature | Amount, % by weight | Solvent Nature | Amount, % by weight | T in °C | Duration | pH | Yields % based on the isophorone introduced |
|---|---|---|---|---|---|---|---|---|
| 17 | None | 0 | Dioxane | 30 | 90 | 1 hr. | 0.4 | 7.8 |
| 18 | " | 0 | $CH_3CN$ | 11.7 | 70 | 1 hr. 15 mins. | " | 14.3 |
| 19 | $CH_3COOH$ | 7.7 | Toluene | 6.4 | " | 1 hr. 15 mins. | " | 23.4 |
| 20 | Pivalic acid | 7.4 | Dioxane | 15 | 90 | " | " | 30.6 |

EXAMPLES 21 TO 23

The procedure of Example 1 is followed, varying the pH of the reaction medium. The conditions and results are listed in the following Table IV.

TABLE IV

| Ex. | Acetic acid % by weight | $Tl^{3+}$ isophorone | T in °C | Duration | pH | Yields in % based on the isophorone introduced |
|---|---|---|---|---|---|---|
| 21 | 30 | 3 | 95 | 6 mins. | 0 | 32.5 |
| 22 | '' | '' | 95 | 3 hrs. 45 mins. | 1 | 24.4 |
| 23 | '' | '' | 85 | 40 mins. | 2.5 | 6 |

The pH was brought to 1 or 2.5 by adding sodium hydroxide solution of density 1.33 to the mixture of 250 cm³ of the solution of thallic sulphate in sulphuric acid and 125 cm³ of anhydrous acetic acid. The pH of value 0 was produced by adding 98% sulphuric acid.

EXAMPLES 24 to 25

The procedure of Example 1 was followed, varying the ratio of $Tl^{3+}$ to isophorone. The conditions and results are listed in the following Table V.

TABLE V

| Ex. | $CH_3COOH$ % by weight | $Tl^{3+}$ isophorone | T in °C | Duration | pH | Yield % based on the isophorone introduced |
|---|---|---|---|---|---|---|
| 24 | 30 | 1.5 | 84 | 83 mins. | 0.45 | 10 |
| 25 | '' | 6 | 100 | 3 hrs. | '' | 37.4 |

EXAMPLE 26

A solution of thallic acetate is prepared by heating 20 g. of thallium oxide ($Tl_2O_3$) in 112 cm³ of anhydrous acetic acid for 1 hour at 70°C. The reaction mixture is then filtered and the filter cake washed with hot acetic acid. In this way, 140 cm³ of a solution of thallic acetate in acetic acid containing 0.272 gram atom of thallium/litre are obtained.

The following are introduced into a 250 cm³ glass flask equipped as in Example 1: a solution of thallic acetate (68 cm³); 10% by weight aqueous solution of $H_2SO_4$ (6 cm³); and isophorone 0.72 g. The pH of the mixture is 0.4. The contents of the flask are heated at the reflux temperature for 45 minutes. The reaction mixture is then treated as in Example 1.

Under these conditions, the yield based on the isophorone introduced is 28.4%.

EXAMPLE 27

The procedure of Example 26 is followed, introducing the following amounts of reagents: solution of thallic acetate: (78 cm³); isophorone (0.96 g.); and water (80 cm³). The pH of the mixture is 2.1. It is heated on a water bath for 10 hours. The yield based on the isophorone introduced is 10.6%.

EXAMPLE 28

The procedure of Example 1 is followed, replacing the aqueous solution of thallic sulphate in sulphuric acid by an aqueous solution of thallic nitrate in nitric acid containing 0.47 gram atom of thallium/litre. 150 cm³ of the thallic solution are introduced per 3.25 g. of isophorone. The reaction mixture is kept at 55°–60°C., for 1 hour 50 minutes. The yield based on the isophorone introduced is 8.3%.

EXAMPLE 29

The procedure of Example 1 is followed, the following ingredients being introduced into the reaction flask: solution of thallic sulphate in sulphuric acid (100 cm³); 2,2'-dipyridyl (4.75 g.); and isophorone (1.38 g.). The reaction mixture is heated from 23 to 85°C., over the course of 40 minutes. The reaction is then complete. Under these conditions, the yield of trimethylbenzoquinone is 18.1% based on the isophorone introduced.

I claim:

1. Process for the preparation of trimethylbenzoquinone, which comprises oxidizing isophorone in the presence of water with a thallium III salt of an inorganic acid, of a sulphonic acid, or of a carboxylic acid or with a complex of such a salt with 2,2'-dipyridyl or phenanthroline.

2. Process according to claim 1, in which the thallium III compound is thallic sulphate, thallic nitrate or thallic acetate.

3. Process according to claim 1, in which the reaction is carried out at an acidic pH.

4. Process according to claim 3, in which the reaction is carried out at a pH below 6.

5. Process according to claim 1, in which the reaction is carried out in the presence of an aliphatic, cycloaliphatic or aromatic mono-or poly-carboxylic acid.

6. Process according to claim 5, in which the reaction is carried out in the presence of acetic acid, propionic acid, acrylic acid, maleic acid, pivalic acid, lactic acid or succinic acid.

7. Process according to claim 5, in which the amount of the carboxylic acid represents at least 0.1% by weight of the reaction mixture.

8. Process according to claim 1, in which the amount of water is at least one mol per mol of isophorone.

9. Process according to claim 1, in which the amount of thallium III compound is at least 1.5 $Tl^{3+}$ ion per molecule of isophorone.

* * * * *